(12) United States Patent
St. Pierre

(10) Patent No.: US 8,077,159 B2
(45) Date of Patent: Dec. 13, 2011

(54) SYSTEMS AND METHODS FOR CORRECTION OF VARIATIONS IN SPEED OF SIGNAL PROPAGATION THROUGH A TOUCH CONTACT SURFACE

(75) Inventor: Richard L. St. Pierre, North Andover, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 374 days.

(21) Appl. No.: 12/501,670

(22) Filed: Jul. 13, 2009

(65) Prior Publication Data

US 2010/0013783 A1 Jan. 21, 2010

Related U.S. Application Data

(60) Provisional application No. 61/080,966, filed on Jul. 15, 2008.

(51) Int. Cl.
*G06F 3/041* (2006.01)

(52) U.S. Cl. ...................................... 345/173; 178/18.01

(58) Field of Classification Search .................. 345/173; 178/18.01–18.09, 19.01–19.07; 700/701–702; 463/36, 37; 702/56
See application file for complete search history.

(56) References Cited

U.S. PATENT DOCUMENTS

| | | | |
|---|---|---|---|
| 6,871,149 B2 | 3/2005 | Sullivan et al. | |
| 6,922,642 B2 | 7/2005 | Sullivan | |
| 7,157,649 B2 | 1/2007 | Hill | |
| 7,184,898 B2 | 2/2007 | Sullivan et al. | |
| 7,411,584 B2 | 8/2008 | Hill et al. | |
| 7,982,724 B2 * | 7/2011 | Hill | 345/177 |
| 2002/0149561 A1 | 10/2002 | Fukumoto et al. | |
| 2004/0233174 A1 | 11/2004 | Robrecht et al. | |
| 2005/0134574 A1 | 6/2005 | Hill | |
| 2005/0146511 A1 | 7/2005 | Hill et al. | |
| 2005/0146513 A1 | 7/2005 | Hill et al. | |
| 2006/0152499 A1 | 7/2006 | Roberts | |
| 2006/0244732 A1 | 11/2006 | Geaghan | |
| 2006/0279548 A1 | 12/2006 | Geaghan | |

OTHER PUBLICATIONS

International Search Report, PCT/US2009/050360, 3 pages.

* cited by examiner

*Primary Examiner* — Abbas Abdulselam
(74) *Attorney, Agent, or Firm* — Steven A. Bern

(57) ABSTRACT

Methods and algorithms for compensating for variances in the uniformity of a touch substrate in a touch sensitive device.

9 Claims, 3 Drawing Sheets

SYSTEMS AND METHODS FOR CORRECTION OF VARIATIONS IN SPEED OF SIGNAL PROPAGATION THROUGH A TOUCH CONTACT SURFACE

CROSS REFERENCE TO RELATED APPLICATION

This application claims the benefit of U.S. Provisional Patent Application No. 61/080,966, filed Jul. 15, 2008, the disclosure of which is incorporated by reference herein in its entirety.

BACKGROUND

A touch sensitive device offers a simple, intuitive interface to a computer or other data processing device. Rather than using a keyboard to type in data, a user can transfer information by touching an icon or by writing or drawing on a touch sensitive panel. Touch panels are used in a variety of information processing applications. Interactive visual displays often include some form of touch sensitive panel. Integrating touch sensitive panels with visual displays is becoming more common with the emergence of next generation portable multimedia devices such as cell phones, personal data assistants (PDAs), and handheld or laptop computers. It is now common to see electronic displays in a wide variety of applications, such as teller machines, gaming machines, automotive navigation systems, restaurant management systems, grocery store checkout lines, gas pumps, information kiosks, and hand-held data organizers, to name a few.

Various methods have been used to determine the location of a touch on a touch sensitive panel. Touch location may be determined, for example, using a number of force sensors coupled to the touch panel. The force sensors generate an electrical signal that changes in response to a touch. The relative magnitudes of the signals generated by the force sensors may be used to determine the touch location.

Capacitive touch location techniques involve sensing a current change due to capacitive coupling created by a touch on the touch panel. A small amount of voltage is applied to a touch panel at several locations, for example, at each of the touch screen corners. A touch on the touch screen couples in a capacitance that alters the current that flows from each corner. The capacitive touch system measures the currents and determines the touch location based on the relative magnitudes of the currents.

Resistive touch panels are typically multilayer devices having a flexible top layer and a rigid bottom layer separated by spacers. A conductive material or conductive array is disposed on the opposing surfaces of the top and bottom layers. A touch flexes the top layer causes contact between the opposing conductive surfaces. The system determines the touch location based on the change in the touch panel resistance caused by the contact.

Touch location determination may rely on optical or acoustic signals. Infrared techniques used in touch panels typically utilize a specialized bezel that emits beams of infrared light along the horizontal and vertical axes. Sensors detect a touch that breaks the infrared beams.

Surface Acoustic Wave (SAW) touch location processes uses high frequency waves propagating on the surface of a glass screen. Attenuation of the waves resulting from contact of a finger with the glass screen surface is used to detect touch location. SAW typically employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

Bending wave touch technology senses vibrations created by a touch in the bulk material of the touch sensitive substrate. These vibrations are denoted bending waves and may be detected using sensors typically placed on the edges of the substrate. Signals generated by the sensors are analyzed to determine the touch location.

SUMMARY

Systems and methods described herein take into account variations in speed of signal propagation, as would be caused, for example, by variations in glass thickness, when determining touch position using bending wave vibration techniques. The systems and methods described herein utilize multiple dispersion corrections and then uses these multiple corrections in the processing of the bending wave vibrations to best account for the glass thickness variation measured. These corrections are also used in an impulse reconstruction validation step to minimize missed touches caused by varying thickness.

In one embodiment, a contact sensitive device is described, the device comprising a substrate capable of supporting bending waves, a plurality of sensors mounted on the substrate for measuring bending wave vibration in the substrate to determine a first measured bending wave signal and a processor which calculates information relating to a contact position from the measured bending wave signal from the sensors, wherein the processor applies a plurality of dispersion corrections based on the dispersion relation of the material of the substrate supporting the bending waves, and wherein some of the plurality of corrections are based upon at least two distinct substrate constants that are representative of varying substrate properties that effect the speed at which a wave propagates through the substrate.

In another embodiment, a method of determining coordinate information related to a contact on a touch sensitive device having a substrate capable of supporting bending waves is described, the method comprising: measuring bending wave vibration in the substrate to determine a first measured bending wave signal using a first sensor mounted on the substrate; determining a second measured bending wave signal which is measured using a second sensor mounted on the substrate; calculating coordinate information relating to the contact from the measured bending wave signal from the first sensor and the second sensor, wherein calculating comprises applying a plurality of dispersion corrections based on the dispersion relation of the material of the substrate supporting the bending waves, and wherein some of the plurality of corrections are based upon at least two distinct substrate constants that are representative of varying substrate properties that effect the speed at which a wave propagates through the substrate.

DETAILED DESCRIPTION

The present invention relates to touch activated, user interactive devices and methods that provide for sensing of vibrations that propagate through a substrate for sensing by a number of transducers. More particularly, the present invention relates to touch sensing devices and methods that employ transducers configured to sense bending wave vibrations that propagate through a substrate, from which touch location information may be determined using disparate touch location detection techniques. Such touch sensing devices, associated algorithms, and techniques used to resolve data from the transducers into a touch location on the substrate are described in U.S. Pat. No. 7,157,649 "Contact Sensitive Device" (Hill); U.S. Pat. No. 6,871,149 "Contact Sensitive Device" (Sullivan et. al.); U.S. Pat. No. 6,922,642 "Contact Sensitive Device" (Sullivan); U.S. Pat. No. 7,184,898 "Contact Sensitive Device" (Sullivan et. al.); and in U.S. Pat. application publication no. 2006/0244732, "Touch Location Determination using Bending Mode Sensors and Multiple Detection Techniques" (Geaghan), the contents of each of which is hereby incorporated by reference in its entirety. These patents disclose, for example, the dispersion correction and the signal processing steps necessary to calculate a touch coordinate from measured bending wave data.

The term bending wave vibration refers to an excitation, for example by a physical contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves. The term bending may also apply to out of plane displacement or deflection of a member when subject to loading, such as when a touch panel deflects (for example, is subject to bowing) in response to a touch applied to the surface of the touch panel. In this regard, one surface of the touch panel is placed in compression, while the opposing surface is placed in tension, which results in bowing of the touch panel. Such bowing of the touch panel may be detected using bending mode sensors of a type described herein and in a manner discussed below.

Figure 1:
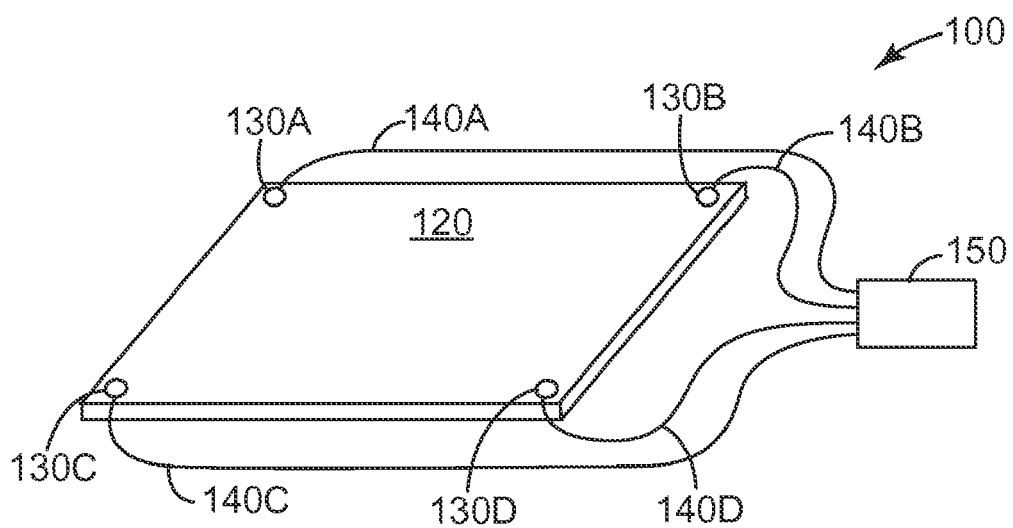
FIG. 1 is a drawing of a touch sensitive device incorporating features and functionality for detecting bending wave vibrations.

Turning now to FIG. 1, there is illustrated one configuration of a touch sensitive device 100 that incorporates features and functionality for detecting bending wave vibrations and determining touch location using a multiplicity of disparate touch location detection techniques. According to this embodiment, the touch sensitive device 100 includes a substrate 120 and vibration sensors 130 which are in turn coupled to an upper surface of the substrate 120. In this illustrative example, the upper surface of the substrate 120 defines a touch sensitive surface. Although vibration sensors 130 are shown coupled to the upper surface of the substrate 120, they can alternatively be coupled to the lower surface of the substrate 120. In another embodiment, one or more vibration sensors 130 may be coupled to the upper surface while one or more other vibration sensors 130 may be coupled to the lower surface of the touch substrate 120. The vibration sensors 130 can be coupled to touch substrate 120 by any suitable means, for example using an adhesive or other suitable material, so long as the mechanical coupling achieved is sufficient for vibrations propagating in the touch plate to be detected by the vibration sensors. Exemplary vibration sensors 130 and vibration sensor arrangements are disclosed in co-assigned U.S. patent application Ser. No. 10/440,650 (Robrecht) and U.S. Ser. No. 10/739,471 (Hill), which are fully incorporated herein by reference into this document.

Substrate 120 may be any substrate that supports vibrations of interest, such as bending wave vibrations. Exemplary substrates 120 include plastics such as acrylics or polycarbonates, glass, steel, aluminum, or other suitable materials. In general, any material whose dispersion relation is known could be used. Touch substrate 120 can be transparent or opaque, and can optionally include or incorporate other layers or support additional functionalities. For example, substrate 120 can provide scratch resistance, smudge resistance, glare reduction, anti-reflection properties, light control for directionality or privacy, filtering, polarization, optical compensation, frictional texturing, coloration, graphical images, and the like. In one embodiment, substrate 120 is a rectangular piece of glass. In another embodiment, substrate 120 is a sheet-type substrate in that it is thin relative to its length and width. In some embodiments, substrate 120 is of relatively uniform thickness. Substrate 120 may be very large, in sizes well exceeding 46" in the diagonal. For example, substrate 120 may be 50", 60", 70", 80", 90" or even 100" in the diagonal. Even larger sizes are conceivable, limited only by the size where vibrations become too small to be detected by the sensors.

Substrate 120 may be already incorporated into some other application not necessarily intended for use as a touch-sensitive device. For example, the sensor boards could be affixed to the glass on a window.

In some embodiments, substrate 120 includes conductive traces running near its edges to reduce the profile of electrical connectors 140. In general, the touch sensitive device 100 includes at least three vibration sensors 130 to determine the position of a touch input in two dimensions, and four vibration sensors 130 (shown as vibration sensors 130A, 130B, 130C, and 130D in FIG. 3) may be desirable in some embodiments, as discussed in U.S. Pat. No. 6,922,642 (Sullivan) and U.S. Pat. No. 7,157,649 (Hill) and in co-assigned U.S. patent application Ser. No. 09/746,405, each of which are fully incorporated herein by reference into this document.

In one embodiment, all of the sensors 130 are configured to sense vibrations in the touch substrate 120. The sensors 130 may be substantially the same in terms of technology and functionality. For example, all of the sensors 130 may be bending mode sensors produced by a particular manufacturer under the same part number or identification. In other embodiments, the sensors 130 may be substantially the same in terms of technology, but differ in terms of functionality. For example, all of the sensors 130 may be bending mode sensors produced by a particular manufacturer, with some of these sensors implemented to detect bending waves and other sensors implemented to detect plate deflection. In some embodiments, one or more of the sensors 130 may be a sensor other than a bending mode sensor.

In accordance with another embodiment, one or more of the sensors 130 can be used as an emitter device to emit a signal that can be sensed by the other sensors 130 to be used as a reference signal or to create vibrations that can be altered under a touch input, such altered vibrations being sensed by the sensors 130 to determine the position of the touch. An electrodynamic transducer may be used as a suitable emitter device. Moreover, one or more of the sensors 130 can be configured as a dual purpose sense and excitation transducer, for example as disclosed in previously incorporated U.S. Pat. Nos. 6,922,642 and 7,157,649, as well as in co-assigned U.S. Pat. No. 7,411,584 (Hill), which is fully incorporated herein by reference into this document.

Many applications that employ touch sensitive devices 100 also use electronic displays to display information through the touch sensitive devices 100. Such displays include, for example, liquid crystal displays, plasma displays, and organic light emitting diode displays. Since displays are typically rectangular, it is typical and convenient to use rectangular touch sensitive devices 100. As such, the touch substrate 120 to which the sensors 130 are affixed is typically rectangular in shape, it being understood that other geometries may be desirable.

According to one configuration, the vibration sensors 130A, 130B, 130C, 130D are preferably placed near the corners of the substrate 120. Because many applications call for a display to be viewed through the touch sensitive devices 100, it is sometimes desirable to place the sensor boards 130A-D near the edges of the touch substrate 120 so that they do not undesirably encroach on the viewable display area. Placement of the vibration sensors 130A-D at the corners of a touch substrate 120 can also reduce the influence of acoustic reflections from the substrate edges.

The contact sensed by the touch sensitive device 100 may be in the form of a touch from a stylus, which may be in the form of a hand-held pen. The movement of a stylus on the touch substrate 120 may generate a continuous signal, which is affected by the location, pressure and speed of the stylus on the touch substrate 120. The stylus may have a flexible tip, for example of rubber, which generates bending waves in substrate 120 by applying a variable force thereto. The variable force may be provided by the tip, which alternatively adheres to or slips across a surface of the substrate 120. Alternatively, the contact may be in the form of a touch from a finger that may generate bending waves in the touch substrate 120, which may be detected by passive and/or active sensing. The bending waves may have frequency components in the ultrasonic region (>20 kHz).

The touch sensitive device 100 shown in FIG. 1 is communicatively coupled to a controller 150. The vibration sensors 130A-D are communicatively coupled to the controller 150 via conductors (for example, wires) or a printed electrode pattern developed on the touch substrate 120. The controller 150 typically includes front end electronics that measure signals or signal changes from the sensors on the vibration sensors 130A-D. In another embodiment, controller 150 applies signals to the sensors on the sensor boards 130A-D. In other configurations, the controller 150 may further include a microprocessor in addition to front end electronics. The controller 150, as is described in detail below, is capable of implementing one or more touch location detection techniques selected from a library of disparate touch location detection techniques, as is described, for example, in patent application publication no. 2006/0244732, "Touch Location Determination using Bending Mode Sensors and Multiple Detection Techniques" (Geaghan), which was earlier incorporated by reference into this document.

In a typical deployment configuration, the touch sensitive device 100 is used in combination with a display of a host computing system (not shown) to provide for visual and tactile interaction between a user and the host computing system. The host computing system may include a communications interface, such as a network interface, to facilitate communications between a touch panel system that incorporates touch sensitive device 100 and a remote system. Various touch panel system diagnostics, calibration, and maintenance routines, for example, may be implemented by cooperative communication between the touch panel system and the remote system.

In vibration sensing touch input devices that include piezoelectric sensors, for example, vibrations propagating in the plane of the touch panel plate stress the piezoelectric sensors, causing a detectable voltage across the sensor. The signal received can be caused by a vibration resulting directly from the impact of a direct touch input or the input of energy due to a trace (friction), or by a touch input influencing an existing vibration, for example by attenuation of the vibration. The signal received can also be caused by an unintended input, such as an input resulting from user handling or mishandling of the touch input device, or from environmental sources external to, but sensed by, the touch input device.

Substrate 120 used in touch-sensitive devices employing bending wave technology may have thickness variations within a sheet exceeding 0.05 mm (and in some cases up to and exceeding 0.13 mm). Since many bending-wave-type touch-sensing algorithms assume constant thickness of the substrate, variations in substrate thickness may cause accuracy errors and missed touches. This is because bending waves move through the substrate at a speed related to the thickness of the medium. Therefore, varying thickness causes the bending waves to travel at different speeds, which may result in less accuracy in determining touch location on the sensor. Embodiments disclosed herein provide systems and methods that account for multiple wave speeds propagating through substrate 120, and accurately determine touch coordinates in sensors which do not have a uniform thickness.

The systems and methods described herein may provide a way to accept the touch substrate 120 "as it is" and accommodate higher variations in glass thickness than would be possible in the absence of these systems and methods. Where substrate 120 is glass, this may allow for less expensive glass manufacturing, as tolerances on thickness variations need not be as onerous. Also, since glass thickness variation becomes more likely with larger sensors, the systems and methods described herein may make it easier to extend the bending wave touch sensing technology to product offerings greater than, for example, 46 inches in the diagonal. Though described herein with respect to bending wave technologies, there are other touch-related technologies that these techniques could be applied to, including force sensor technologies and active acoustic touch technologies.

The high level steps in a bending wave touch sensing algorithm are as follows (more fully described in the earlier-referenced patents and patent applications):

1. Input signals from vibration sensors (assume 4 channels for this example) are filtered and transformed to the frequency domain via a Fast Fourier Transform (FFT).
2. Input signals are then normalized and combined in pairs using a form of generalized cross-correlation. This process removes common noise and delays from the signal, making it easier to determine a touch location. In one embodiment there are six cross-correlation functions calculated.
3. These six functions are then transformed from the frequency domain to the wavenumber domain using a dispersion correction function that accounts for the dispersive nature of bending waves in plate-type substrates. As described in the earlier incorporated references, and particularly U.S. Pat. No. 6,922,642, this dispersion correction function uses a substrate constant C, defined by $C=(\mu/B)^{1/4}$, where $\mu$=mass per unit area of the substrate, and B=bending stiffness of the substrate. Removing the dispersive effects allows for the calculation of the distance difference between the touch point and the two sensors used in the cross-correlation.
4. These six functions are then transformed to the spatial domain via an inverse-FFT.

5. The maximum of each function defines the distance difference from the touch point to the two sensors for each cross-correlation. This distance difference defines a hyperbola containing potential touch solutions. With 6 cross-correlation functions, 6 hyperbolae are calculated and the intersection is determined to be the touch point.
6. For certain types of inputs (taps, for example) a final confirmation step occurs. Once the touch point has been determined (i.e., step 5), the four input signals are back-propagated to the touch point using a time reversal process that takes into account the dispersive effects of the bending waves. If the touch point is accurate, the back-propagated signals from all 4 input channels should approximately the same. This process is referred to as impulse reconstruction, and is disclosed in US application 2005/0146511 (Hill/Sullivan), which is incorporated by reference in its entirety.

One approach to algorithmically accommodate variations in speed of signal propagation through the substrate 120 (that is, variations in substrate thickness) focuses on steps 3 and 6, as discussed below.

Figure 2:
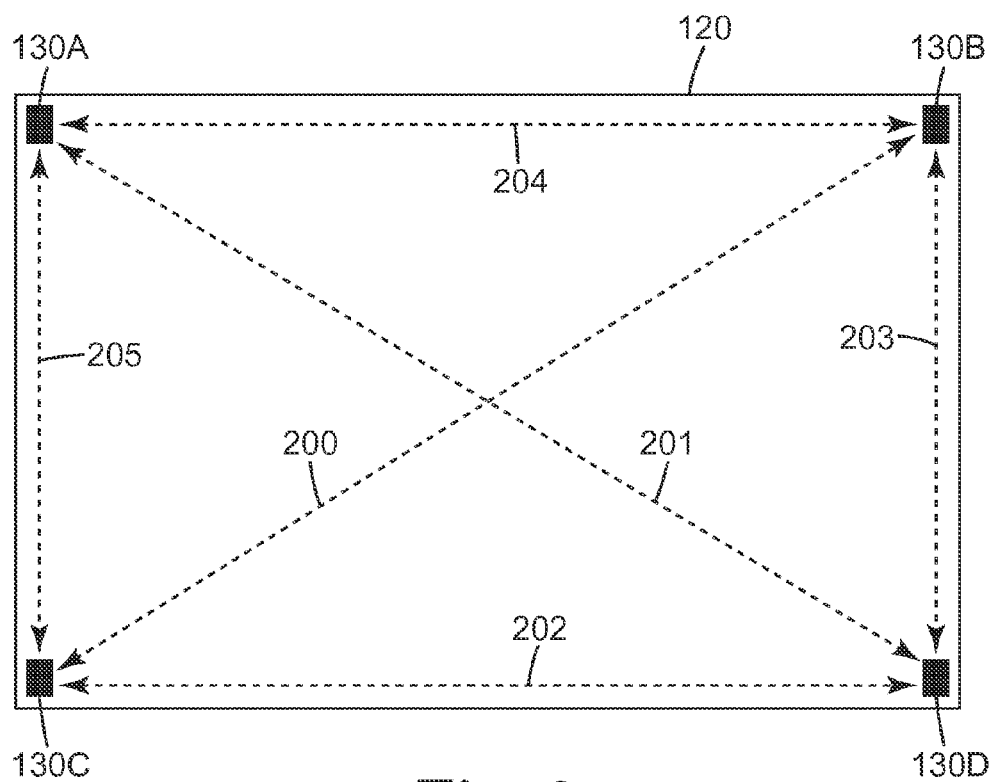
FIG. 2 is a representation of sensor 120.

FIG. 2 shows a representation of sensor 120 employing bending wave touch sensing technology; the four vibration sensors are numbered in each corner, the same as in FIG. 1 (Electrical connectors 140 and controller 150 are not shown in this figure). The dashed lines indicate sensor pair combinations that correspond to the six correlation functions. In the algorithm described above, all six correlation functions are transformed using a single dispersion correction matrix, based on the substrate constant C. The equation for this transformation is:

$$x_i(k) = Dx_i(\omega), i = 0 \ldots 5$$

Where D is the dispersion correction matrix, $x_i(\omega)$ is correlation function i in the frequency domain, and $x_i(k)$ is correlation function i in the wave number domain.

To accommodate variations in speed of signal propagation through the touch contact medium, individual $D_i$ correction matrices replace the constant D correction matrix. In the most general sense, each of the 6 correlation functions could be said to have its own dispersion correction matrix, based on individual substrate constants (C).

These individual dispersion correction matrices account for different material properties or different frequency bandwidths in addition to different thicknesses. In one example embodiment, the individual dispersion correction matrices are determined based different thicknesses. However, since each correlation function relates to two sensors, it may not be clear what thickness values to use in each case. One approach to determining what thickness value to use is to use the mean thickness measured at or near the two respective sensors. For example, a measurement at position 130C (lower left hand corner) and position 130D (lower right hand corner) would define the thickness value across sensor pair 202 (which is represented by the dashed line extending from position 130C to position 130D).

Step 6 implements impulse reconstruction, which propagates the signal measured at each sensor backward in time to the time of an impact (touch) to substrate 120 (t=0) based on the estimated touch location. If this touch location is accurate, all four sensors should calculate the same reconstructed impulse. Impulse reconstruction is done by adjusting the phase at each frequency by the estimated propagation time for that frequency (remembering that in dispersive media, every frequency has a different wave speed). These phase adjustments are stored in a vector, w, based on the substrate constant C. When using multiple substrate constants, multiple phase adjustments are used (similar to step 3, above). In general, each sensor can have its own phase adjustment vector based on the thickness of the glass at the sensor. In addition, it is possible to further customize the phase adjustment vectors based on the presumed location of the touch. For example, the phase adjustment vector for a given sensor could be linearly adjusted based on the presumed distance from the touch away from the sensor, or, as shown in the example below, be a linear combination of two different phase adjustment vectors. This allows for the thickness at the presumed touch point to be used instead of a generic value.

Determining Thickness Values to Use

One way to measure the values used by these improved algorithms is to directly measure them using a micrometer, laser, or other measurement device. However, several more efficient indirect methods of measuring the thickness are available, including:

Calculation of thickness by directing broadband, high-frequency noise at the touch contact medium at a pre-determined location using an acoustic source and measuring the responses at the four sensors;

Calculation of thickness by tapping the touch contact medium at a pre-determined location and measuring the responses at the four sensors; or Using an active piezoelectric transducer mounted on the touch contact medium to excite the medium and measure the response at the four sensors.

In one embodiment, these indirect thickness measurement methods can either be done during a calibration phase, with the results stored in the controller memory, or during operation, either automatically in the background or when requested by the user.

Example

A proof of concept was done using a glass substrate and two substrate constants, resulting in two dispersion matrices and two phase adjustment vectors. It was determined that acceptable results could be obtained for panels with one edge (two corners) that is thicker than the other edge (other two corners). This matches the type of thickness variations typically seen within substrates such as glass.

Figure 3:
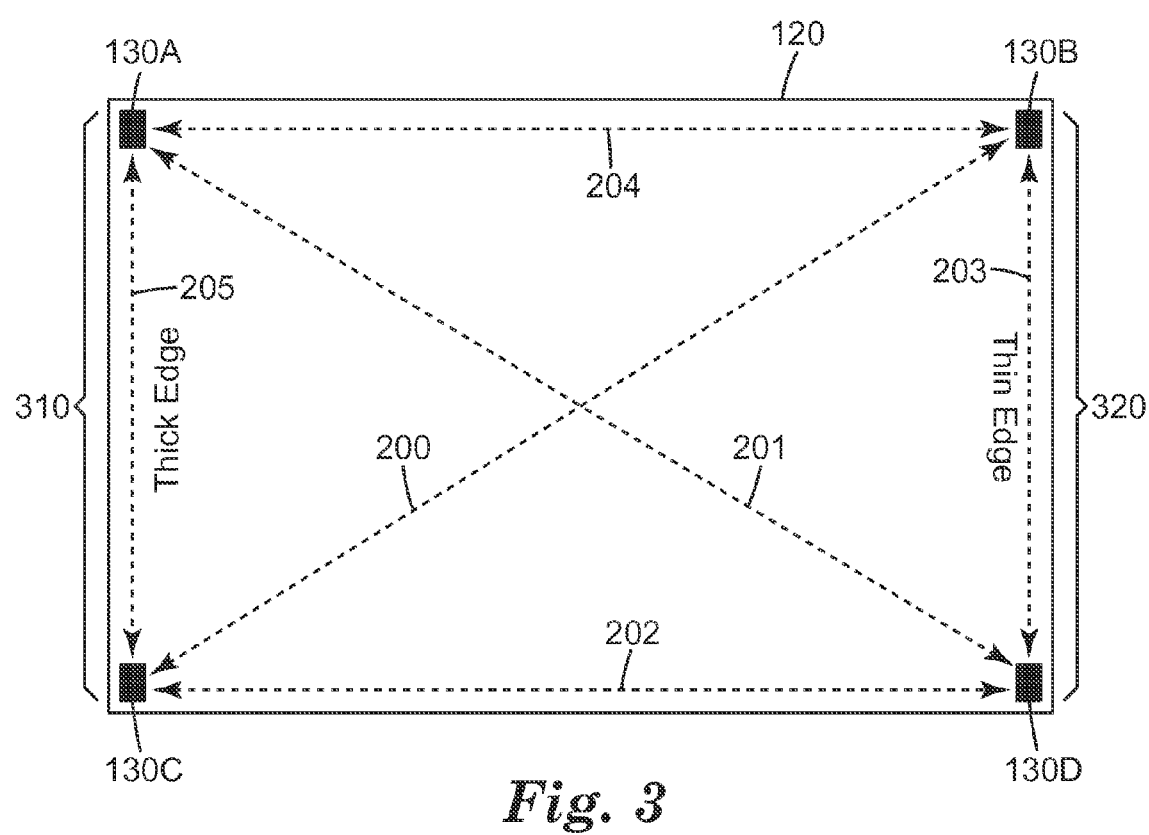
FIG. 3 is a representation of sensor 120.

Turning now to FIG. 3, we calculated two substrate constants, one based on the thickness at the thin edge (310) and the other based on the thickness at the thick edge (320). In doing the dispersion correction, the thin edge dispersion matrix was used for all correlation functions except the one along the thick edge.

For impulse reconstruction, it was thought to use the thick phase adjustment vector for the two thick corners (130A and 130C) and the thin phase adjustment vector for the two thin corners (130B and 130D). However, it was found that this did not yield satisfactory results. The reason for this is that the vibrations traveling across the plate see different thickness as they travel. Therefore, errors are seen if we assume constant travel through only thick or thin glass. To overcome this, a combination of both phase adjustment vectors is used according to the following equations:

$$X = \alpha\rho$$

$$Y = \beta(1-\rho)$$

$$\phi_{thick} = Xw_{thin} + (1-X)w_{thick}$$

$$\phi_{thin} = (1-Y)w_{thin} + Yw_{thick}$$

where:

ρ is the ratio of the distance away from the thick edge to the total length of the edge. For example, for a coordinate right along the thick edge, ρ=0 and for a coordinate right along the thin edge ρ=1.

α is a constant, defined in the algorithm as ¼ (0.75)

β is a constant, defined in the algorithm as ¼ (0.25)

X and Y are two ratios defining the weighting of the thin versus thick phase adjustment vectors (w) to use. X defines the ratio to use for the thick corners and Y defines the ratio to use for the thin corners.

As an example, for a touch in the center of the panel, ρ=0.5 which makes X=0.375 and Y=0.125. Therefore for the thick corners, the phase adjustment ($\phi_{thick}$) is a ratio weighting the thin phase adjustment vector ($w_{thin}$) by 0.375 and the thick phase adjustment vector ($w_{thick}$) by 0.625. For the thin corners, the phase adjustment ($\phi_{thin}$) is a ratio weighting the thin phase adjustment vector ($w_{thin}$) by 0.875 and the thick phase adjustment vector ($w_{thick}$) by 0.125.

The weighting values α and β were determined experimentally by verifying proper alignment of the reconstructed impulses.

Figure 4:
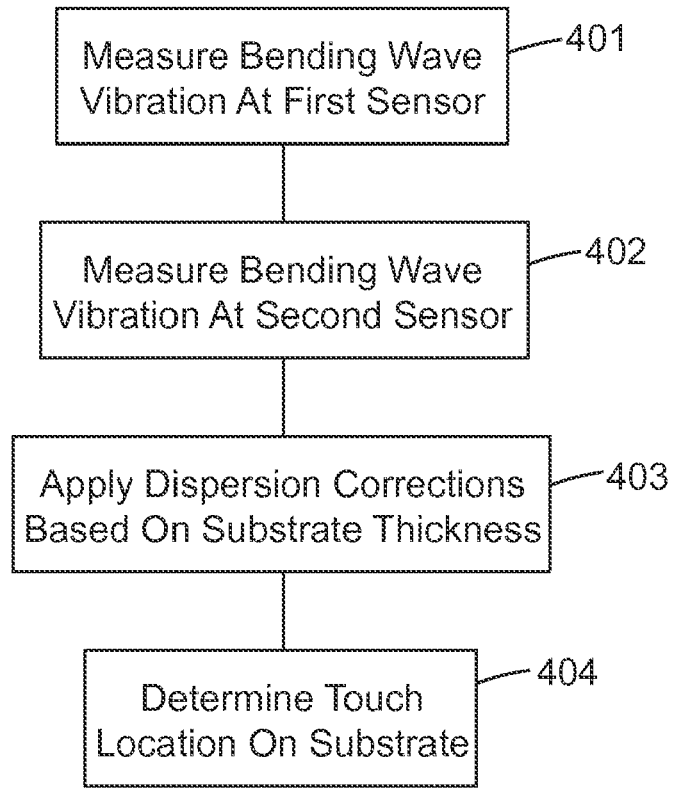
FIG. 4 is a flowchart showing process steps for determining a touch location on a substrate having non-uniform thickness.

We tested these algorithms on a 813 mm (diagonal) that had a thickness variation of 0.075 mm (2.275 mm on thick edge and 2.200 mm on thin edge). FIG. 4 shows the high-level process for applying corrections, including first measuring the bending wave vibration at a first sensor (401), then at a second sensor that is on a part of the substrate having a different thickness (402). Dispersion corrections are applied as described above (403), and the coordinates of the touch location on the substrate is determined (404). This last step (404) includes the impulse recognition verification step.

Figure 5:
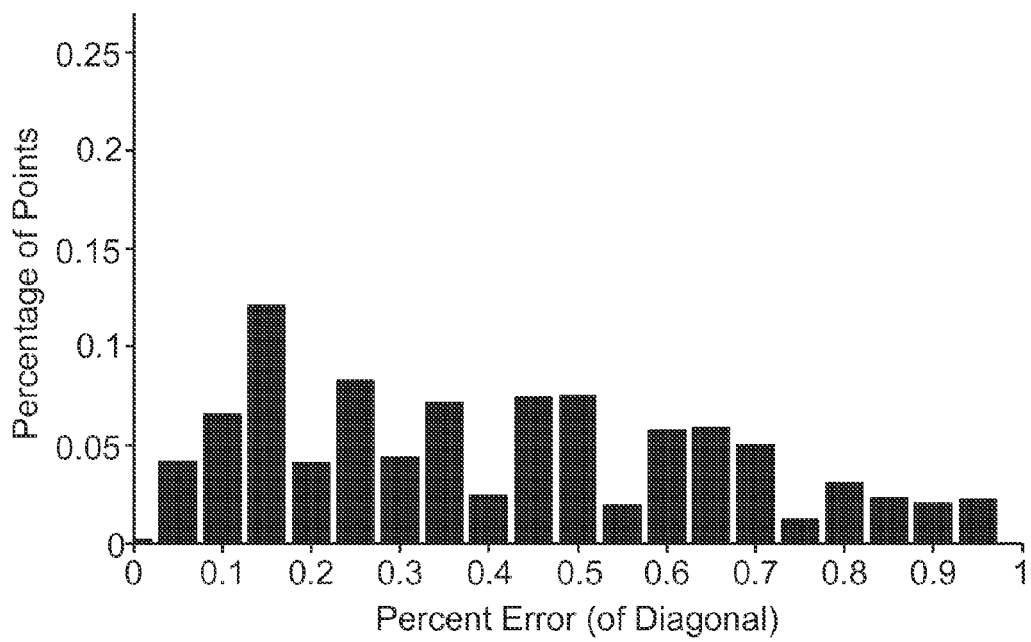
FIG. 5 is a graph showing testing results in an embodiment where corrections described herein were not used.

FIG. 5 shows errors measured for a standard accuracy test without the use of any of the corrective algorithms disclosed herein (control). The accuracy test involved tapping the sensor 30 times at each of 41 pre-determined points on the sensor (16 along the perimeter and 25 in the body of the sensor). Testing was done using an automated machine that can precisely apply taps to particular locations. In this manner, very accurate measurements of location error can be determined.

Figure 6:
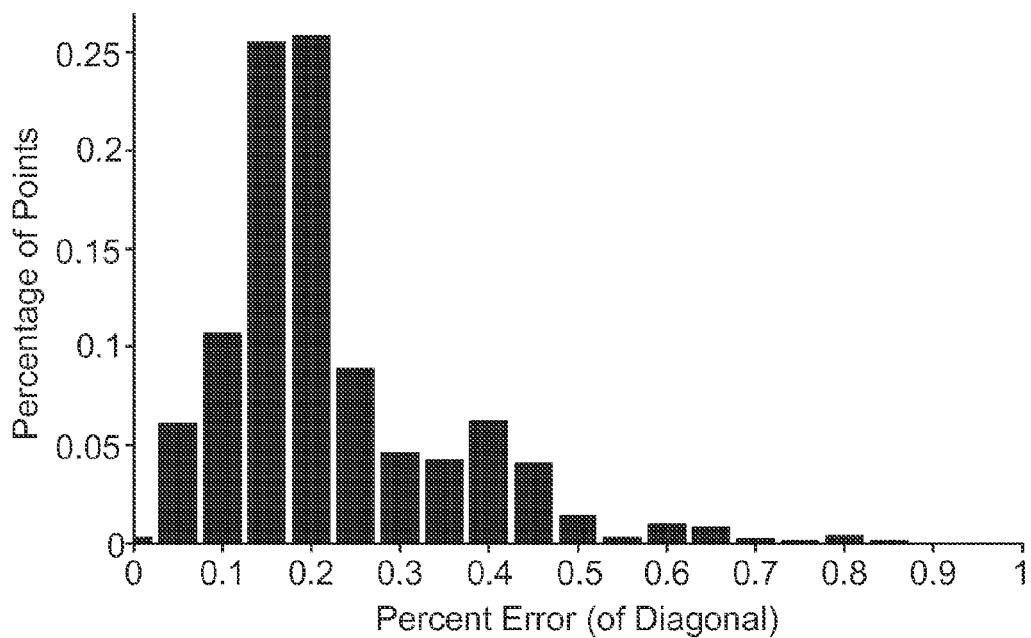
FIG. 6 is a graph showing testing results in an embodiment where corrections described herein were used.

FIG. 6 shows the results of the same test as summarized in FIG. 5, but this time using the corrective algorithms described herein.

The results show a significant reduction of error between control test and the test using corrective algorithms, with the mean error reduced by more than half (from 0.41% in the test associated with FIG. 5 to 0.19% in the test associated with FIG. 6). Also the number of reference touch points with errors greater than 0.5% has been significantly reduced (from 373 to 31).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A contact sensitive device comprising a substrate capable of supporting bending waves, a plurality of sensors mounted on the substrate for measuring bending wave vibration in the substrate to determine a first measured bending wave signal and a processor which calculates information relating to a contact position from the measured bending wave signal from the sensors, wherein the processor applies a plurality of dispersion corrections based on the dispersion relation of the material of the substrate supporting the bending waves, and wherein some of the plurality of corrections are based upon at least two distinct substrate constants that are representative of varying substrate properties that effect the speed at which a wave propagates through the substrate.

2. The contact sensitive device of claim 1, wherein the differing substrate properties refer to varying thicknesses of the substrate.

3. The contact sensitive device of claim 2, wherein the substrate is glass.

4. The contact sensitive device of claim 3, wherein the substrate constant=$(\mu/B)^{1/4}$, where $\mu$=mass per unit area of the substrate, and B=bending stiffness of the substrate.

5. The contact sensitive device of claim 2, wherein the plurality of corrections are based upon at least six distinct substrate constants.

6. A method of determining coordinate information related to a contact on a touch sensitive device having a substrate capable of supporting bending waves, the method comprising:
    measuring bending wave vibration in the substrate to determine a first measured bending wave signal using a first sensor mounted on the substrate;
    determining a second measured bending wave signal which is measured using a second sensor mounted on the substrate;
    calculating coordinate information relating to the contact from the measured bending wave signal from the first sensor and the second sensor, wherein calculating comprises applying a plurality of dispersion corrections based on the dispersion relation of the material of the substrate supporting the bending waves, and wherein some of the plurality of corrections are based upon at least two distinct substrate constants that are representative of varying substrate properties that effect the speed at which a wave propagates through the substrate.

7. The method of claim 6, wherein the differing substrate properties refer to varying thicknesses of the substrate.

8. The method of claim 7, wherein the substrate is glass.

9. The method of claim 8, wherein the substrate constant=$(\mu/B)^{1/4}$, where $\mu$=mass per unit area of the substrate, and B=bending stiffness of the substrate.

* * * * *